(12) United States Patent
Kim et al.

(10) Patent No.: US 9,815,349 B2
(45) Date of Patent: Nov. 14, 2017

(54) INTEGRATED COOLING SYSTEM FOR ECO-FRIENDLY VEHICLE

(71) Applicants: Hyundai Motor Company, Seoul (KR); Kia Motors Corporation, Seoul (KR)

(72) Inventors: Jaeyeon Kim, Hwaseong-si (KR); Manhee Park, Suwon-si (KR)

(73) Assignee: HYUNDAI MOTOR COMPANY, Seoul (KR)

(*) Notice: Subject to any disclaimer, the term of this patent is extended or adjusted under 35 U.S.C. 154(b) by 0 days.

(21) Appl. No.: 14/876,647

(22) Filed: Oct. 6, 2015

(65) Prior Publication Data

US 2016/0023537 A1    Jan. 28, 2016

Related U.S. Application Data

(62) Division of application No. 12/957,078, filed on Nov. 30, 2010, now Pat. No. 9,180,753.

(30) Foreign Application Priority Data

Dec. 3, 2009 (KR) .................. 10-2009-0119135
Nov. 23, 2010 (KR) .................. 10-2010-0117150

(51) Int. Cl.
B60H 1/32 (2006.01)
F25D 23/12 (2006.01)
(Continued)

(52) U.S. Cl.
CPC ....... B60H 1/3202 (2013.01); B60H 1/00885 (2013.01); B60H 1/323 (2013.01);
(Continued)

(58) Field of Classification Search
CPC ...... B60H 1/00885; B60H 2001/00928; B60L 2240/36; B60K 2001/003; B60K 2001/005; Y02T 10/7077
(Continued)

(56) References Cited

U.S. PATENT DOCUMENTS 6,045,934 A   4/2000 Enami
6,370,903 B1  4/2002 Wlech
(Continued)

FOREIGN PATENT DOCUMENTS

CN   10152187 A   9/2009
EP   1 289 039 A2  3/2003
(Continued)

*Primary Examiner* — Joseph Trpisovsky
(74) *Attorney, Agent, or Firm* — Morgan, Lewis & Bockius LLP

(57) ABSTRACT

The present invention makes it possible to integrate and control in one circuit the systems, such as electric power components, a driving motor, a stack, and an AC condenser which have the maximum enthalpy under similar operational temperature and use conditions, by using an integrated radiator. Therefore, it is possible to minimize air-through resistance of the radiator for cooling the stack and the electric power components and ensure smooth and stable cooling performance of the stack, electric power components, and AC condenser while improving fuel efficiency by reducing the condensation pressure of the air conditioner. Further, it is possible to improve cooling efficiency by non-repeatedly arranging heat exchangers, and reduce the weight of a vehicle, volume of the parts, and the manufacturing cost, by avoiding using too many parts, such as a radiator, a water pump, and a reservoir tank.

7 Claims, 6 Drawing Sheets

(51) Int. Cl.
  *B60H 1/00* (2006.01)
  *B60L 3/00* (2006.01)
  *B60L 11/14* (2006.01)
  *B60L 11/18* (2006.01)
  *F25B 5/04* (2006.01)
  *B60K 1/00* (2006.01)

(52) U.S. Cl.
  CPC ............ *B60L 3/0023* (2013.01); *B60L 11/14* (2013.01); *B60L 11/1874* (2013.01); *B60L 11/1892* (2013.01); *F25B 5/04* (2013.01); *B60H 2001/00928* (2013.01); *B60H 2001/3289* (2013.01); *B60H 2001/3292* (2013.01); *B60K 2001/005* (2013.01); *B60L 2240/36* (2013.01); *Y02T 10/70* (2013.01); *Y02T 10/7077* (2013.01); *Y02T 10/88* (2013.01)

(58) Field of Classification Search
  USPC .................. 62/239, 244, 335, 332, 259.2
  See application file for complete search history.

(56) References Cited

U.S. PATENT DOCUMENTS

| | | | |
|---|---|---|---|
| 6,450,275 | B1 | 9/2002 | Gabriel et al. |
| 7,191,858 | B2 | 3/2007 | Vanderwees et al. |
| 7,845,187 | B2 | 12/2010 | Patel et al. |
| 2001/0045103 | A1 | 11/2001 | Khelifa |
| 2004/0108148 | A1* | 6/2004 | Vanderwees ............ F01P 7/165 180/65.1 |
| 2005/0257563 | A1 | 11/2005 | Hoshi et al. |
| 2006/0278365 | A1 | 12/2006 | Sanada et al. |
| 2007/0000262 | A1 | 1/2007 | Ikegami et al. |
| 2008/0078542 | A1 | 4/2008 | Gering et al. |
| 2008/0251235 | A1 | 10/2008 | Zhou |
| 2009/0193828 | A1* | 8/2009 | Cocchi et al. ................. 62/222 |
| 2011/0132017 | A1 | 6/2011 | Kim et al. |

FOREIGN PATENT DOCUMENTS

| | | |
|---|---|---|
| EP | 1 265 305 A3 | 12/2007 |
| JP | 08-258548 A | 10/1996 |
| JP | 11-107748 A | 4/1999 |
| JP | 2004-189069 A | 7/2004 |
| JP | 2004-203289 A | 7/2004 |
| JP | 2005-104404 A | 4/2005 |
| JP | 2005-125818 A | 5/2005 |
| JP | 2005-186879 A | 7/2005 |
| JP | 2005-306300 A | 11/2005 |
| JP | 2006-59573 A | 3/2006 |
| JP | 2006-103537 A | 4/2006 |
| JP | 2006-327325 A | 12/2006 |
| JP | 2007-099239 A | 4/2007 |
| JP | 2007-186047 A | 7/2007 |
| JP | 2008-56152 A | 3/2008 |
| JP | 2008-126917 A | 6/2008 |
| JP | 2008-173992 A | 7/2008 |
| JP | 2010-173357 A | 8/2010 |
| KR | 10-2004-0018252 A | 3/2004 |
| KR | 10-2005-0027720 A | 3/2005 |
| KR | 10-2006-0028594 A | 3/2006 |
| KR | 10-0622735 B1 | 9/2006 |

* cited by examiner

INTEGRATED COOLING SYSTEM FOR ECO-FRIENDLY VEHICLE

CROSS-REFERENCE TO RELATED APPLICATIONS

The present application is a Divisional of U.S. patent application Ser. No. 12/957,078 filed Nov. 30, 2010, which claims priority to Korean Patent Application Numbers 10-2009-0119135 and 10-2010-0117150 filed Dec. 3, 2009 and Nov. 23, 2010, respectively, the entire contents of which are incorporated herein for all purposes by these references.

BACKGROUND OF THE INVENTION

Field of the Invention

The present invention relates to a cooling system for an eco-friendly vehicle, and more particularly, to a cooling system that cools a stack, electric power components, motors, and an air conditioner coolant in a fuel cell vehicle, or cools electric power components, motors, and an air conditioner coolant of a hybrid vehicle or an electric vehicle.

Description of Related Art

Fuel cells have the advantage of generating electricity without environmental pollution, because they produce little air pollutants and carbon dioxide, and also have higher electricity generation efficiency than thermal power generation of the related art, such that eco-friendly vehicles using a fuel cell as the power source have been increasingly developed.

Meanwhile, hybrid vehicles can appropriately use power from a motor and an engine to drive the vehicles in accordance with traveling conditions of the vehicles, and the technology of driving a vehicle with a motor is necessary for the fuel cell vehicles.

It is a problem in driving a vehicle with a motor to dissipate heat generated by the operation of the motor and heat generated by phase change of current in an inverter.

Therefore, it is technologically necessary to cool electric power components, such as the motor and the inverter, and effectively cool the stack of the fuel cell, in fuel cell vehicles.

FIG. 1 is a diagram illustrating a cooling system of a fuel cell vehicle in the related art, which includes a cooling circuit composed of separate water pump, reservoir tank, and radiator for cooling electric power components and a cooling circuit composed of separate water pump, reservoir tank, and radiator for cooing a stack, in which an air-cooling type AC condenser is disposed between the radiators to cool an air conditioner with a cooling fan.

Further, the cooling system shown in FIG. 2 is a water-cooling type that cools the AC condenser with water, in which a separate cooling circuit composed of a water pump circulating cooling water to the water-cooling type air conditioner, a reservoir tank, and a radiator for cooling an AC coolant is included and the radiator for cooling an AC coolant is disposed between the stack-radiator and the electric power components-radiator to cool them with a cooling fan.

In the cooling systems in the related art, the configuration shown in FIG. 1 has difficulty in ensuring sufficient cooling performance, because the air-cooling type AC condenser increases ventilation resistance for the electric power components-radiator and the stack-radiator. In particular, the electric power components and the stack are operated at low temperature as compared with the existing internal combustion engines and require a high-capacity radiator because the enthalpy is very larger than the internal combustion engines, but the increase of thickness of the radiator increases ventilation resistance and decreases the amount of heat dissipation, such that a technology of arranging a cooling module and optimizing the capacity, considering the operational temperature of the electric power components and the stack is required.

On the other hand, the configuration shown in FIG. 2 has a problem that it needs too many parts, such as a radiator, a water pump, and a reservoir, by forming cooling circuits for the stack, electric power components, and the AC condenser, decreases the cooling effect by repeatedly arranging heat exchangers, and has an adverse effect on weight, arrangement of parts, and manufacturing cost of a vehicle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

The present invention has been made in an effort to provide a cooling system for an eco-friendly vehicle that minimizes ventilation resistance of radiators for cooling a stack and electric power components, ensures smooth and stable cooling performance for the stack, the electric power components, and an AC condenser, improves fuel efficiency by reducing condensation pressure of the air conditioner, improves cooling efficiency due to non-repeated arrangement of heat exchangers and reduces weight of the vehicle, volume of the parts, and manufacturing cost, without using unnecessarily a number of parts, such as a radiator, a water pump and a reservoir tank.

An exemplary embodiment of the present invention provides an integrated cooling system for an eco-friendly vehicle, which includes: a first radiator; electric power components disposed to be cooled in a closed circular cooling circuit including the first radiator; and an AC condenser disposed to be cooled in the a closed circular cooling circuit including the first radiator.

Further, another exemplary embodiment of the present invention provides an integrated cooling system for an eco-friendly vehicle, which includes: a second radiator; a stack disposed to be cooled in a closed circular cooling circuit including the second radiator; and an AC condenser disposed to be cooled in the a closed circular cooling circuit including the second radiator.

According to exemplary embodiments of the present invention, it is possible to minimize ventilation resistance of radiators for cooling a stack and electric power components, ensure smooth and stable cooling performance for the stack, the electric power components, and an AC condenser, improve fuel efficiency by reducing the condensation pressure of the air conditioner, and improve cooling efficiency due to non-repeated arrangement of heat exchangers and reduce weight of the vehicle, volume of the parts, and manufacturing cost, without using unnecessarily a number of parts, such as a radiator, a water pump, and a reservoir tank.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
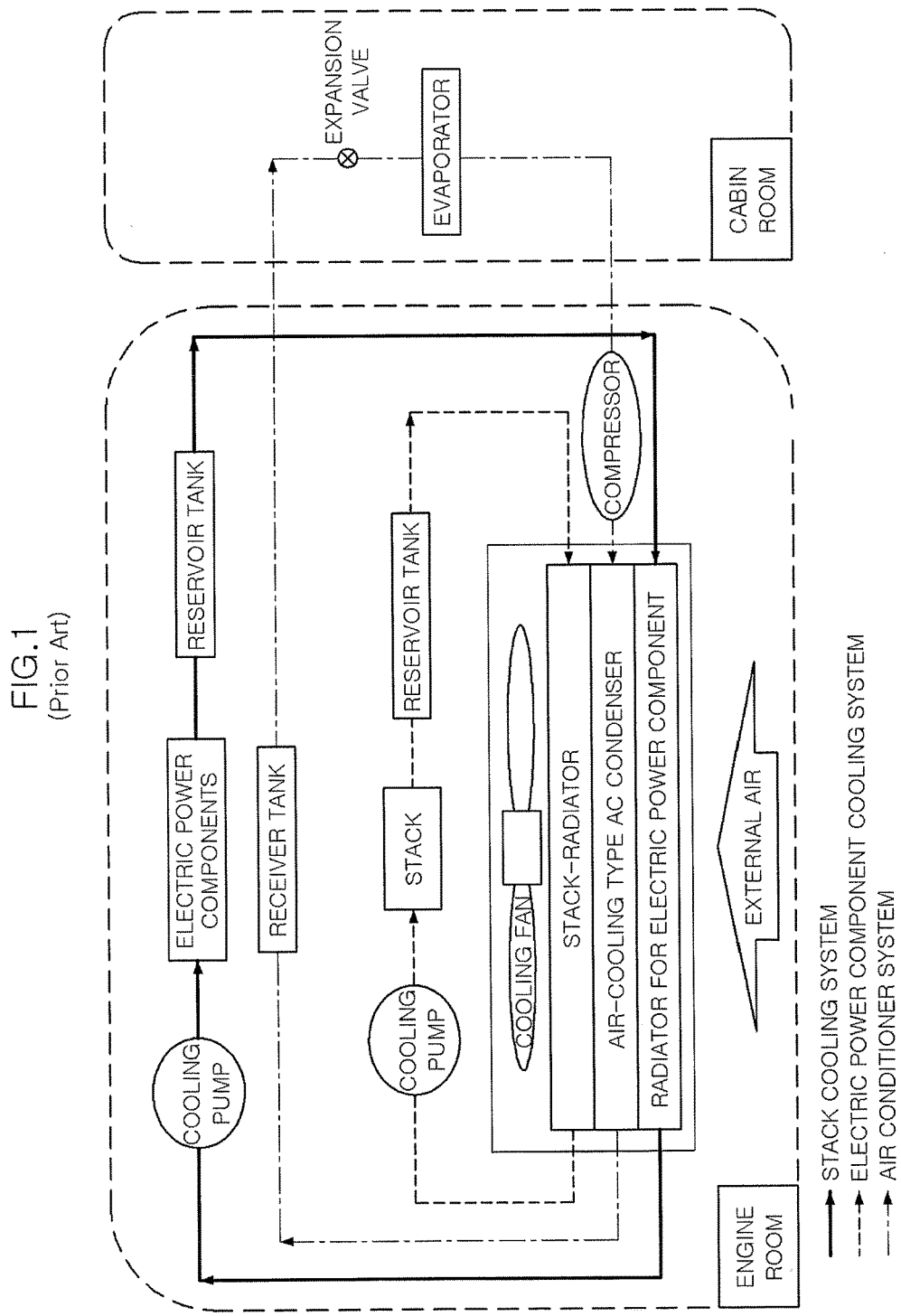
FIG. 1 and FIG. 2 are diagrams illustrating a cooling system of a fuel cell vehicle of the related art.
Figure 2:
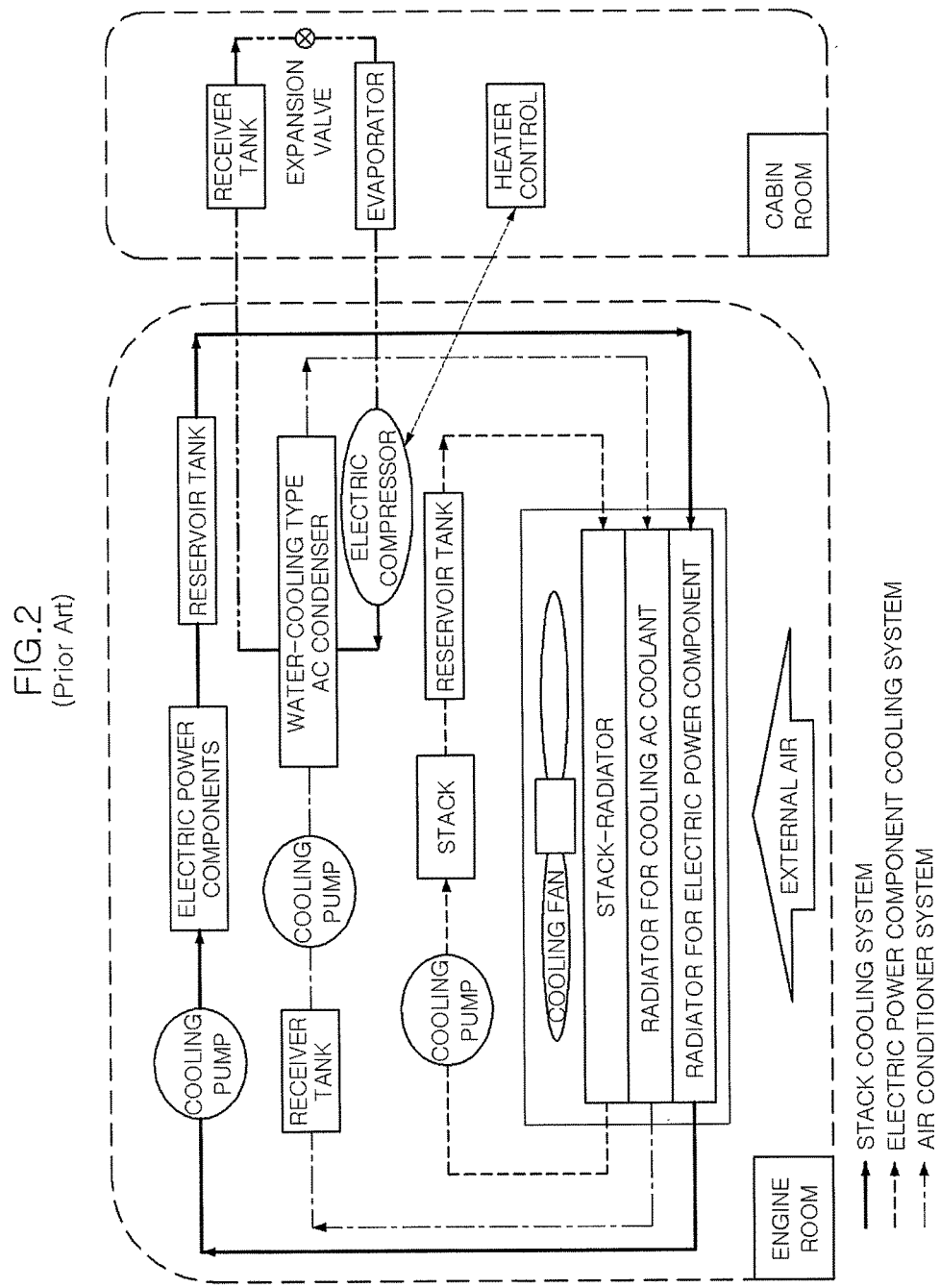

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIGS. 3 to 6, integrated cooling systems for an eco-friendly vehicle according to exemplary embodiments of the present invention include: a first radiator 1; a first cooling line 7 implementing a closed circular cooling circuit with first radiator 1 and cooling a first part 3 including some of a plurality of electric power components, and a driving motor 5; a second cooling line 11 implementing a closed circular cooling circuit with first radiator 1, in parallel with first cooling line 7, and cooling a second part 9 including the others of the electric power components; a second radiator 13; and a third cooling line 17 implementing a closed circular cooling circuit with second radiator 13 and cooling a stack 15.

That is, first cooling line 7 and second cooling line 11 are arranged in parallel to share first radiator 1, while third cooling line 17 implements the closed circular cooling line by individually using second radiator 13.

In this configuration, third cooling line 17 may be removed in hybrid vehicles or electric vehicles which do not use a stack.

Driving motor 5 is a part that supplies driving force for a vehicle and the electric power components are a plurality of electric components, such as an inverter that handles electricity flowing into/out of driving motor 5 by electrically connecting stack 15 with driving motor 5, and some of the electric components is first part 3 and the other is second part 9.

Obviously, the electric power components may be configured to be cooled together in first part 3 or may be configured to be cooled together in second part 9, not divided into first part 3 and second part 9. Further, the electric power components may be disposed to be cooled by all of or any one of first cooling line 7 and second cooling line 11, which implement the closed circular cooling circuits including first radiator 1.

For reference, the exemplary embodiments shown in FIGS. 3 to 6 exemplify when the electric power components are divided into first part 3 and second part 9 and arranged to be cooled by both first cooling line 7 and second cooling line 11.

First radiator 1 and second radiator 13 are arranged adjacent to each other in series in the cooling wind path formed by the same cooling fan 19.

That is, second radiator 13 is disposed close to cooling fan 19, while first radiator 1 is disposed further from cooling fan 19 than second radiator 13, such that air sucked by cooling fan 19 passes through second radiator 13, through first radiator 1.

A first pump 23 is disposed between first radiator 1 and a node 21 of first cooling line 7 and second cooling line 11 to send a coolant from first radiator 1 to node 21 under pressure while a second pump 25 is disposed between second radiator 13 and stack 15 to send a coolant from second radiator 13 to stack 15 under pressure.

Therefore, first pump 23 pumps up the coolant from first radiator to node 21, such that some of the pumped coolant circulates to first radiator 1 along first cooling line 7 from node 21, while the other circulates to first radiator 1 along second cooling line 11 from node 21. Further, the coolant in second radiator 13 is pumped up by a second pump 25, individually from first cooling line 7 or second cooling line 11, and circulates to second radiator 13 through stack 15.

First part 3 and driving motor 5 are arranged in series such that the coolant that has cooled first part 3 cools driving motor 5 in first cooling line 7. A first reservoir tank 27 is disposed before first part 3 in first cooling line 7 and a second reservoir tank 29 is disposed after stack 15 in third cooling line 17.

In this configuration, the reason that driving motor 5 is disposed after first part 3 is because the operational temperature of driving motor 5 is relatively higher than operational temperature of the electric power components of first part 3, and this is for allowing the coolant cools driving motor 5 after cooling first part 3.

The configuration described above is in common in the first exemplary embodiment to the fourth exemplary embodiment and the exemplary embodiments have a difference in the position of AC condensers disposed in the common configuration.

Figure 3:
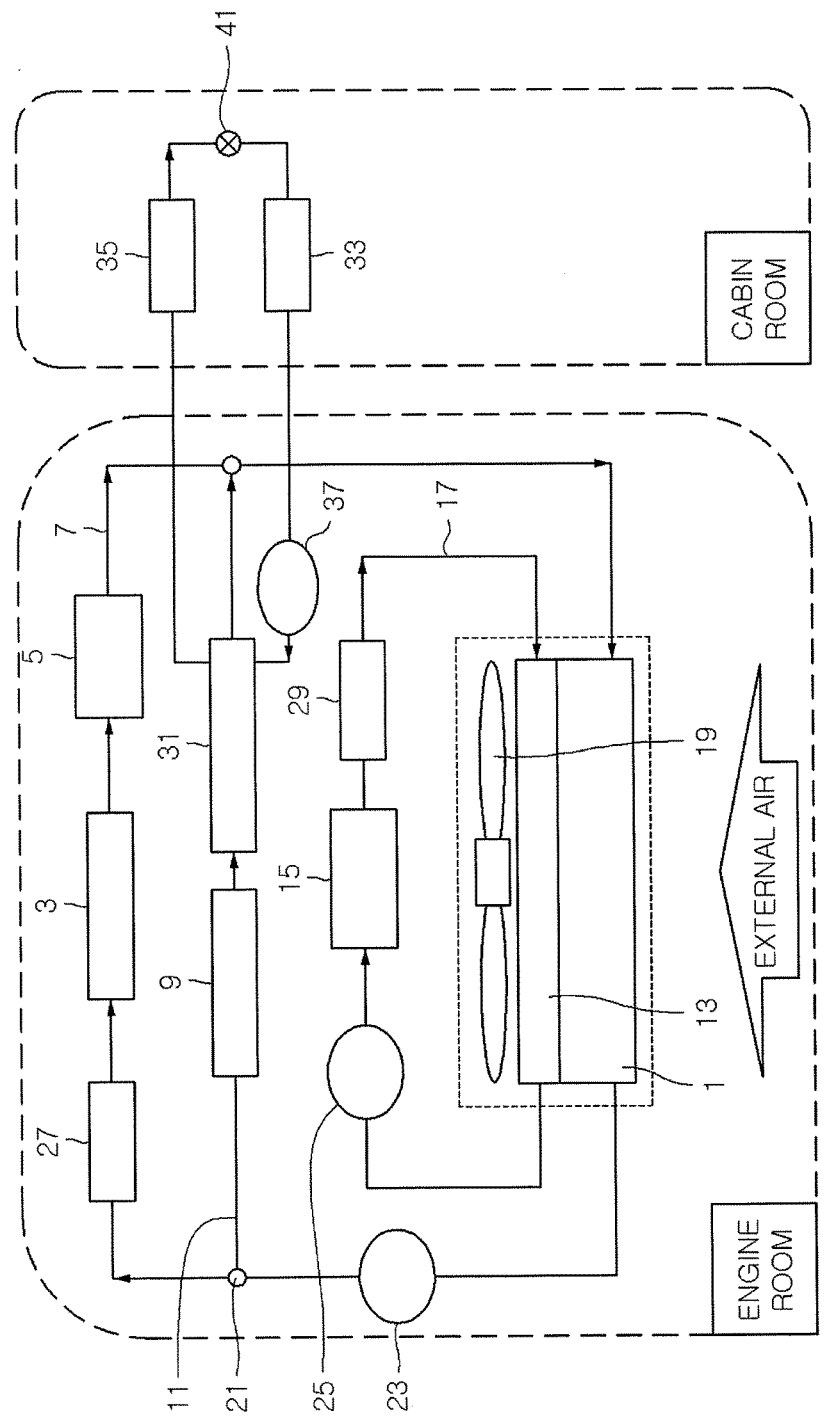
FIG. 3 is a diagram illustrating a first exemplary embodiment according to the present invention.

In the first exemplary embodiment of FIG. 3 an AC condenser 31 is disposed after second part 9 of second cooling line 11 to be cooled by the coolant that has cooled second part 9.

Obviously, the operational temperature of the electric power components depends on the types, such that the electric power components may be disposed after AC condenser 31 in some cases.

That is, the electric power components of second part 9 and AC condenser 31 are arranged in series in second cooling line 11, the same cooling circuit, while AC condenser 31 can be considered to be arranged in parallel with respect to first part 3 and the driving motor in first cooling line 7.

Obviously, AC condenser 31 is included in a cooling circuit including an evaporator 33, a compressor, an expansion valve 41, and a receiver 35 to cool the interior of a vehicle.

In this configuration, it is preferable that the compressor is an electric compressor 37 such that the operation can be controlled on the basis of the operational states of the devices in the cooling line including AC condenser 31, for example, driving motor 5, first part 3, second part 9, or stack 15, depending on the exemplary embodiments.

That is, in the first exemplary embodiment of FIG. 3, second part 9 is cooled by second cooling line 11 that is the same cooling line of AC condenser 31, in which it is possible to improve fuel efficiency of the vehicle and performance of cooling the interior due to reduction of condensation pressure of the AC coolant by increasing the cooling performance of AC condenser 31 by using first radiator 1 under small output of second part 9, whereas it is possible to improve cooling performance of second part 9 by reducing the output of electric compressor 37 such that the amount of heat discharged from AC condenser 31 is reduced, under large output of second part 9.

Figure 4:
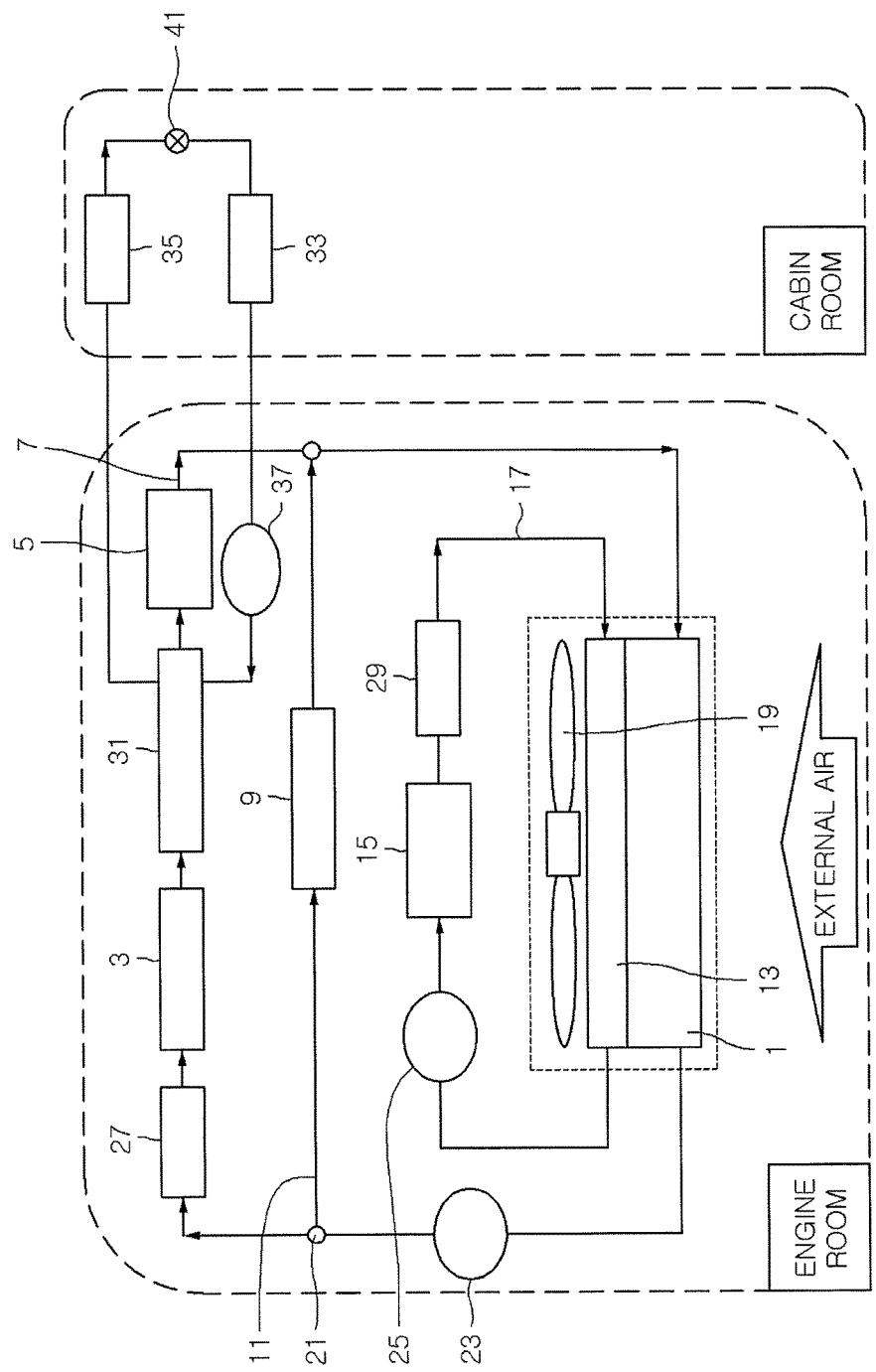
FIG. 4 is a diagram illustrating a second exemplary embodiment according to the present invention.

In the second exemplary embodiment of FIG. 4, an AC condenser 31 is disposed between first part 3 and driving motor 5 in first cooling line 7 to be cooled by the coolant that has cooled first part 3.

In this configuration, AC condenser 31 may be considered to be arranged in series in the same cooling line with respect to first part 3 and may be considered to be connected in parallel to first radiator 1 with respect to second part 9, in which first part 3 and second part 9 may not be necessarily divided, as shown in FIG. 4, and may be collected at any one of them to be cooled together.

In this exemplary embodiment, AC condenser 31 is disposed to be cooled together with first part 3 and driving motor 5 by the coolant flowing along first cooling line 7 and first cooling line 7 is configured such that AC condenser 31 is cooled by the coolant passing through first part 3 having lower operational temperature than AC condenser 31 and driving motor 5 having higher operational temperature than AC condenser 31 is then cooled by the coolant that has cooled AC condenser 31.

Similarly, in this exemplary embodiment, it is possible to improve fuel efficiency of a vehicle and cooling performance due to reduction of condensation pressure of the AC coolant by increasing the cooling performance of AC condenser 31, using electric compressor 37 included in the same cooling circuit of AC condenser 31, when the output of first part 3 and driving motor 5 is low, and it is possible to improve performance of cooling first part 3 and driving motor 5 by reducing the output of electric compressor 37, when the output of first part 3 and driving motor 5 is large, thereby improving the commercial value of the vehicle.

Figure 5:
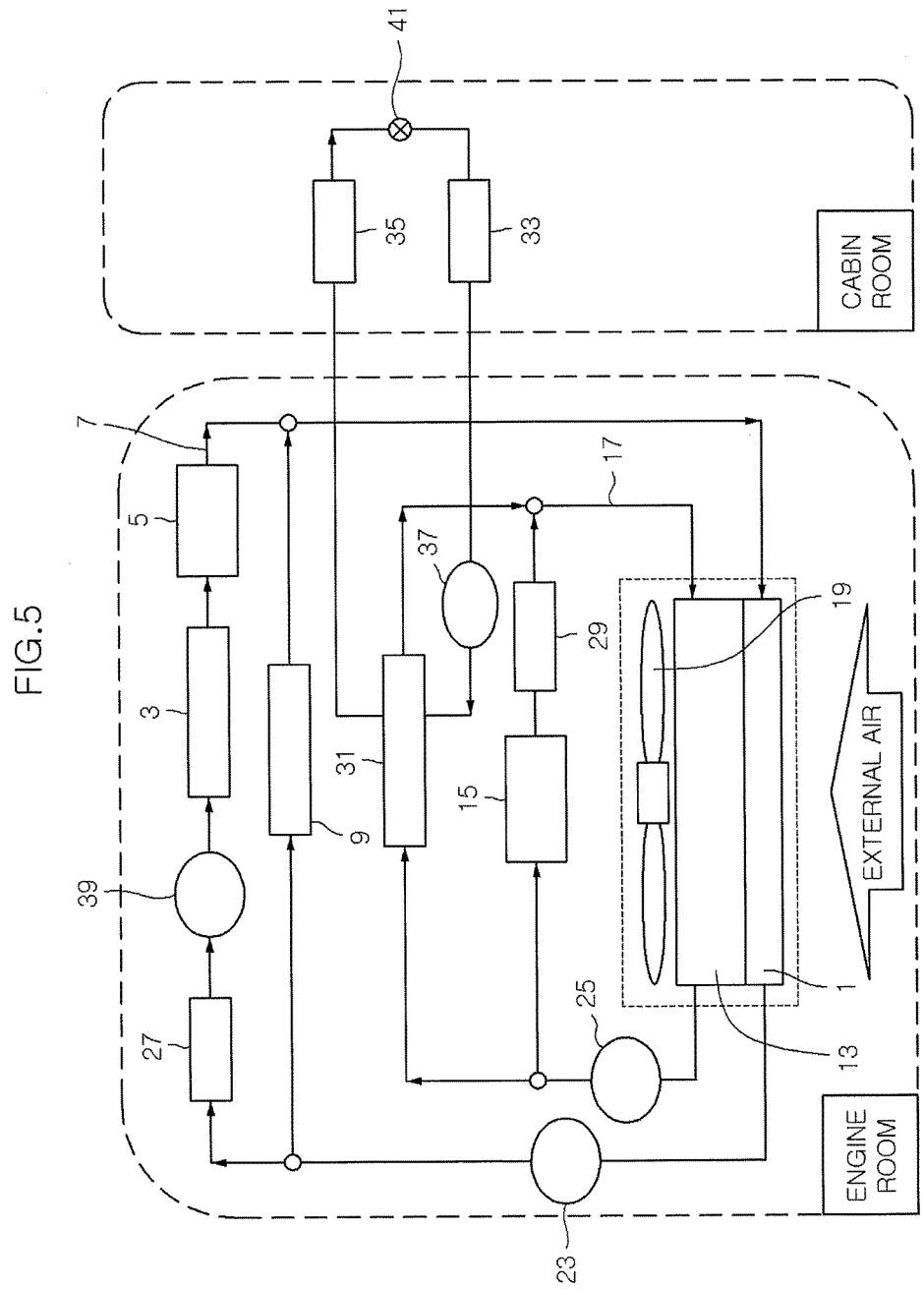
FIG. 5 is a diagram illustrating a third exemplary embodiment according to the present invention.

In the third exemplary embodiment of FIG. 5, an AC condenser 31 is arranged in parallel with a stack 15 with respect to a second pump 25 and a second radiator 13 to be cooled with stack 15 by a coolant from second pump 25 of third cooling line 17.

Further, a third pump 39 is further disposed between first reservoir tank 27 and first part 3 in first cooling line 7.

That is, as second pump 25 pumps up a coolant from second radiator 13 and supplies the coolant simultaneously to AC condenser 31 and stack 15, AC condenser 31 and stack 15 are separately cooled and the coolant returns to second radiator 13, while third pump 39 in first cooling line 7 strengthens the flow of the coolant flowing along first cooling line 7 such that the cooling performance of first part 3 and driving motor 5 is more improved than second part 9.

Similarly, in this exemplary embodiment, it is possible to improve fuel efficiency of a vehicle and performance of cooling the interior due to reduction of condensation pressure of the AC coolant by increasing the cooling performance of AC condenser 31, using second radiator 13, under small output of stack 15, while it is possible to improve the cooling performance of stack 15 by decreasing the output of electric compressor 37 such that the amount of heat discharged from Ac condenser 31 is reduced, under large output of stack 15.

Figure 6:
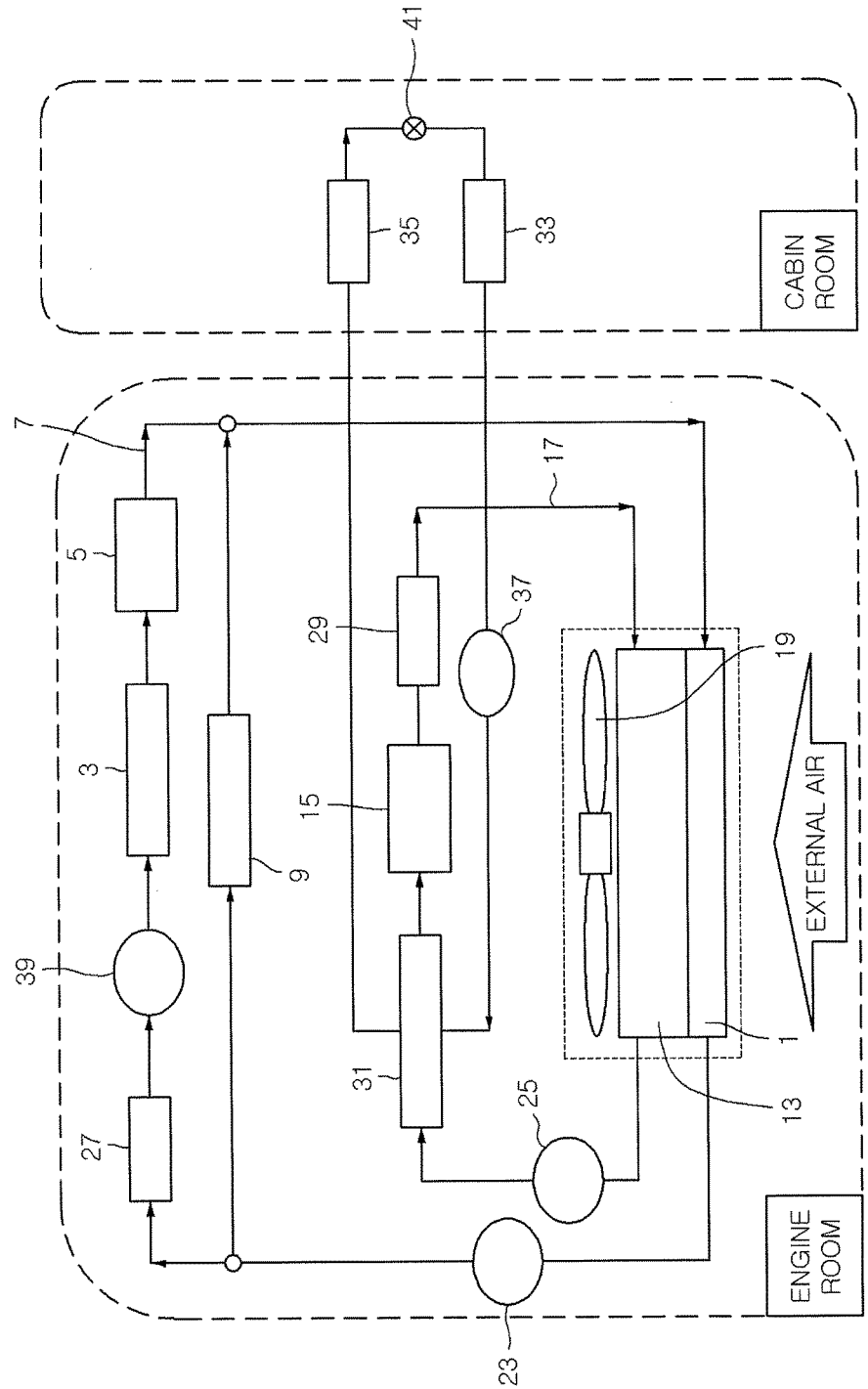
FIG. 6 is a diagram illustrating a fourth exemplary embodiment according to the present invention.

FIG. 6 is a diagram showing the fourth exemplary embodiment of the present invention, in which an AC condenser 31 is disposed between a second pump 25 and stack 15 in third cooling line 17 to be cooled by a coolant from second pump 25, and a third pump 39 is disposed between first reservoir tank 27 and first part 3 in first cooling line 7.

AC condenser 31 and stack 15 are arranged to be cooled in series in third cooling line 17, in which stack 15 is cooled by the coolant that has cooled AC condenser 31 because the operational temperature of the AC condenser is lower than the operational temperature of stack 15.

In this configuration, the condensation temperature of the coolant of the cooling circuit including the AC condenser depends on the types, such that the stack may be disposed before the AC condenser in some cases. That is, it is preferable that the AC condenser is disposed after the stack, when the coolant is carbon dioxide ($CO_2$).

Similarly, in this exemplary embodiment, it is possible to improve fuel efficiency of a vehicle and performance of cooling the interior due to reduction of condensation pressure of the AC coolant by increasing the cooling performance of AC condenser 31, using second radiator 13, under small output of stack 15, while it is possible to improve the cooling performance of stack 15 by decreasing the output of electric compressor 37 such that the amount of heat discharged from Ac condenser 31 is reduced, under large output of stack 15.

According to exemplary embodiments of the present invention described above, it is possible to reduce the number of pump, reservoir tank, and radiator, decrease the weight of a vehicle, ensure a space for an engine room, as compared with when a cooling circuit for electric power components and a cooling circuit for AC condenser 31 are separately provided in the related art, and consequently, it is possible to reduce the manufacturing cost of a vehicle.

Further, first radiators 1 cooling AC condensers 31 of the first exemplary embodiment and the second exemplary embodiment can improve cooling efficiency by increasing capacity more than the radiator for electric power components of the related art such that flow resistance of the coolant therein reduces and the flow rate of the coolant correspondingly increases. Further, second radiator 13 of the third exemplary embodiment and the fourth exemplary embodiment can improve cooling efficiency by increasing capacity more than the stack-radiator 15 of the related art such that flow resistance of the coolant therein reduces and the flow rate of the coolant correspondingly increases.

Further, according to the radiators in the first exemplary embodiment to the fourth exemplary embodiment, as described above, since only two radiators, first radiator 1 and second radiator 2, overlap each other, air-through resistance is reduced as compared with when three or more radiators overlap each other in the related art, such that it is possible to achieve improved cooling efficiency.

As described above, the present invention makes it possible to integrate and control in one circuit the systems, such as electric power components, a driving motor, a stack, and an AC condenser which have the maximum enthalpy under similar operational temperature and use conditions, by using an integrated radiator. Therefore, it is possible to minimize air-through resistance of the radiator for cooling the stack and the electric power components and ensure smooth and stable cooling performance of the stack, electric power components, and AC condenser while improving fuel efficiency by reducing the condensation pressure of the air conditioner. Further, it is possible to improve cooling efficiency by non-repeatedly arranging heat exchangers, and reduce the weight of a vehicle, volume of the parts, and the manufacturing cost, by avoiding using too many parts, such as a radiator, a water pump, and a reservoir tank.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An integrated cooling system for an eco-friendly vehicle, comprising:
    a first radiator connected on a first closed circular cooling circuit with a first pump disposed directly in front of and branching through a node so as to simultaneously cool electric power components including a first part and a second part and disposed in parallel, and wherein the first part is arranged before a driving motor which has higher temperature than that of the first part;
    a second radiator, wherein the first radiator and the second radiator are arranged adjacent to each other in series in a cooling wind path formed by the same cooling fan;
    a stack disposed to be cooled in a second closed circular cooling circuit including the second radiator; and
    an AC condenser disposed to be cooled in the second closed circular cooling circuit including the second radiator, wherein the stack and the AC condenser are arranged in parallel with the second radiator, the AC condenser is connected to implement a cooling circuit, together with an electric compressor having variable cooling capacity, and wherein the second part is disposed adjacent to the AC condenser, and wherein a cooling performance of the AC condenser is configured to be increased by using the second radiator under a small output of the stack, a cooling performance of the stack is configured to be improved by decreasing an output of the electric compressor such that an amount of heat discharged from an AC coolant of the AC condenser is reduced under a large output of the stack.

2. The integrated cooling system for an eco-friendly vehicle as defined in claim 1, wherein the second radiator is disposed close to the cooling fan, and
    the first radiator is disposed further from the cooling fan than the second radiator, such that air sucked by the cooling fan passes through the second radiator, through the first radiator.

3. The integrated cooling system for an eco-friendly vehicle as defined in claim 1, wherein the driving motor is arranged in series in the cooling circuit including the electric power components.

4. The integrated cooling system for an eco-friendly vehicle as defined in claim 1, wherein the driving motor is arranged in parallel with the first radiator and the electric power components are arranged in parallel with the first radiator.

5. The integrated cooling system for an eco-friendly vehicle as defined in claim 2, wherein the electric power components are divided into a plurality of parts and each part of the electric power components is in parallel with the first radiator, wherein the plurality of parts include the first part and the second part.

6. The integrated cooling system for an eco-friendly vehicle as defined in claim 2, wherein a pump and a reservoir tank are further disposed in the first cooling circuit connected to the first radiator.

7. The integrated cooling system for an eco-friendly vehicle as defined in claim 1, wherein the coolant of the AC condenser is carbon dioxide.

* * * * *